(12) United States Patent
Witherspoon et al.

(10) Patent No.: US 6,708,793 B2
(45) Date of Patent: Mar. 23, 2004

(54) DOUBLE-ISOLATED, SYMMETRIC, HIGH-DAMPED MOUNT SYSTEM

(75) Inventors: William B Witherspoon, Lansing, MI (US); Brian J Koepele, Ann Arbor, MI (US); William L Hendrickson, White Lake, MI (US)

(73) Assignee: General Motors Corporation, Detroit, MI (US)

( * ) Notice: Subject to any disclaimer, the term of this patent is extended or adjusted under 35 U.S.C. 154(b) by 6 days.

(21) Appl. No.: 09/853,015

(22) Filed: May 11, 2001

(65) Prior Publication Data

US 2002/0166711 A1 Nov. 14, 2002

(51) Int. Cl.[7] .................................................. B60K 1/00
(52) U.S. Cl. ....................................... 180/291; 180/299
(58) Field of Search ................................. 180/291, 295, 180/297, 299, 300, 292

(56) References Cited

U.S. PATENT DOCUMENTS

| | | | |
|---|---|---|---|
| 4,240,517 A | * 12/1980 | Harlow et al. | ............. 180/295 |
| 4,451,054 A | * 5/1984 | Allison | ....................... 280/104 |
| 4,901,814 A | 2/1990 | von Broock et al. | |
| 5,092,566 A | * 3/1992 | Freudenberg | .......... 267/140.14 |
| 5,133,427 A | 7/1992 | Arvidsson et al. | |
| 5,291,966 A | * 3/1994 | Kato | ........................... 180/292 |
| 5,758,738 A | * 6/1998 | Carroll et al. | .............. 180/292 |

* cited by examiner

Primary Examiner—Jack Lavinder
Assistant Examiner—Melanie Torres
(74) Attorney, Agent, or Firm—Laura C. Hargitt

(57) ABSTRACT

A system for mounting a vehicle power train, such as a transversely mounted engine and transmission, to a motor vehicle such that vibrations from the power train are isolated from the vehicle frame. The system comprises a power train mounting cradle for mounting to the vehicle frame by a vibration-isolating mounts, and vibration-isolating mounts for connecting the power train to the cradle, at least one of the power train to cradle mounts adapted to damp torque-related vibrations, and further comprising a friction damper to attenuate low-frequency torque-related vibrations.

11 Claims, 2 Drawing Sheets

DOUBLE-ISOLATED, SYMMETRIC, HIGH-DAMPED MOUNT SYSTEM

BACKGROUND OF THE INVENTION

1. Field of the Invention

The invention relates to a power train mounting system for a motor vehicle. In one of its aspects, the invention relates to a cradle for mounting the power train in a motor vehicle. In another of its aspects, the invention relates to a power train mounting system isolating the power train from the vehicle frame. In another of its aspects, the invention relates to an isolated cradle mounting system for a transversely mounted power train.

2. Description of the Related Art

A power train for a motor vehicle is typically mounted to a power train cradle, or sub-frame, the cradle being mounted to the motor vehicle frame by vibration-absorbing mounts to attenuate the transfer of vibrations from the power train to the vehicle frame. The prior art typically further includes substantially non-damping connections directly between the power train and the vehicle frame to restrain torque generated by the power train. Such substantially rigid connections are known to serve as a torque brace for a transversely mounted engine, such as is disclosed in U.S. Pat. Nos. 5,133,427 and 4,901,814. Such substantially non-damping connections bypass the vibration isolation elements mounting the cradle to vehicle frame, thereby transferring vibrations from the power train directly to vehicle frame.

It would be advantageous to provide a power train mount system wherein the torque is restrained, and the related vibrations are isolated, within the cradle structure so that the vibrations to the vehicle frame are attenuated.

SUMMARY OF THE INVENTION

A system for mounting a vehicle power train, such as a transversely mounted engine and transmission, to a motor vehicle such that vibrations from the power train are isolated from the vehicle frame. The system comprises a power train mounting cradle for mounting to the vehicle frame by vibration-isolating mounts, and vibration-isolating mounts for connecting the power train to the cradle, at least one of the power train to cradle mounts adapted to damp torque-related vibrations, and further comprising a friction damper to attenuate low-frequency translation-related vibrations.

DESCRIPTION OF THE PREFERRED EMBODIMENT

A double-isolated, symmetric, high-damped mount system 10 according to the invention includes an engine and transmission (collectively "powertrain") mounting cradle 20 for mounting to a vehicle frame (not shown). The cradle 20 is mounted to the vehicle frame at a number of connection points 14 incorporating an elastomeric or hydraulic damping system to isolate vibrations generated or carried by the cradle from the vehicle frame. These well-known connection points 14 include an elastomeric bushing 16 housing a hydraulic damper.

Figure 1:
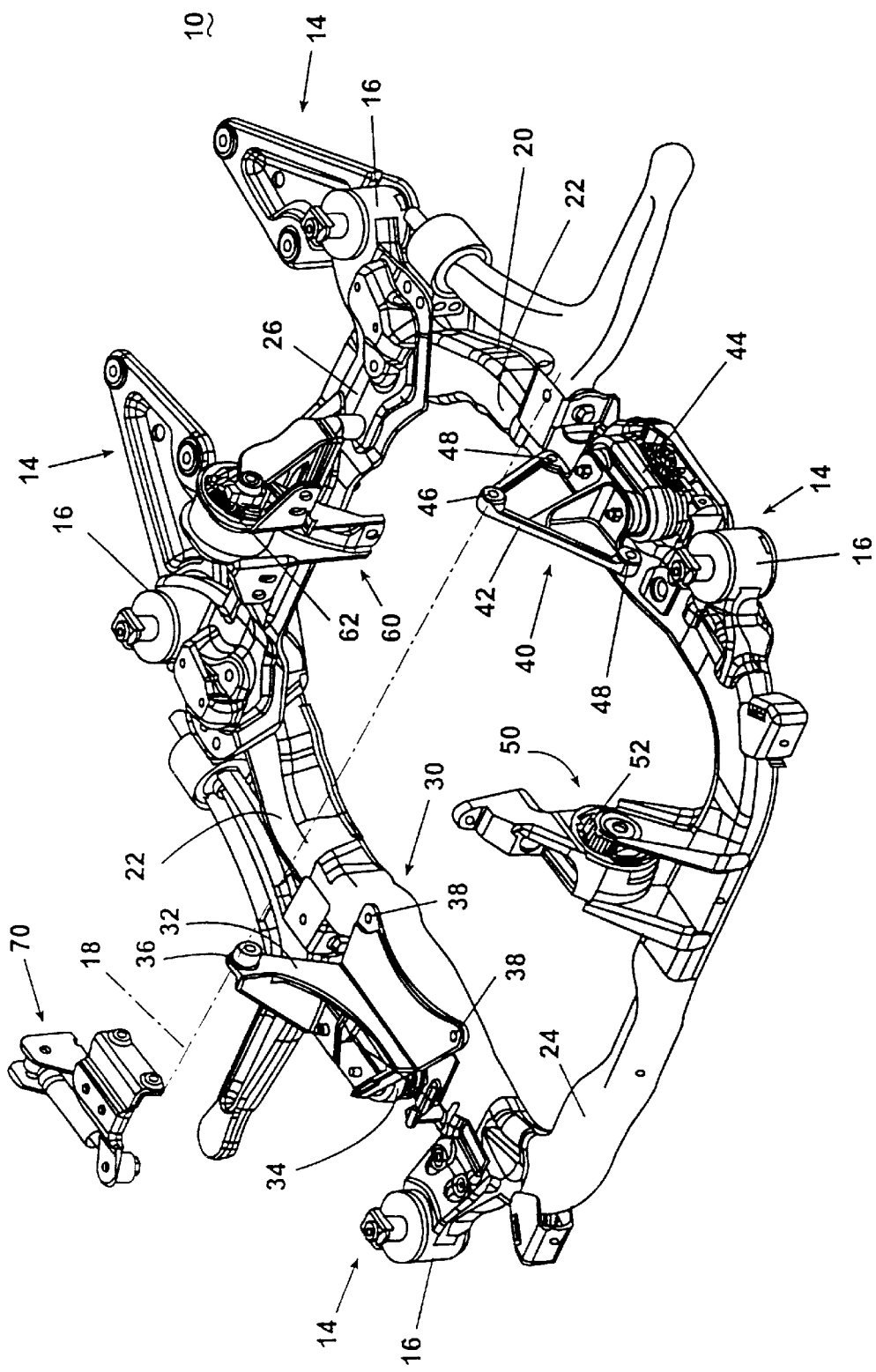
FIG. 1 is a perspective view of a double-isolated, symmetric, high-damped mount system according to the invention.
Figure 2:
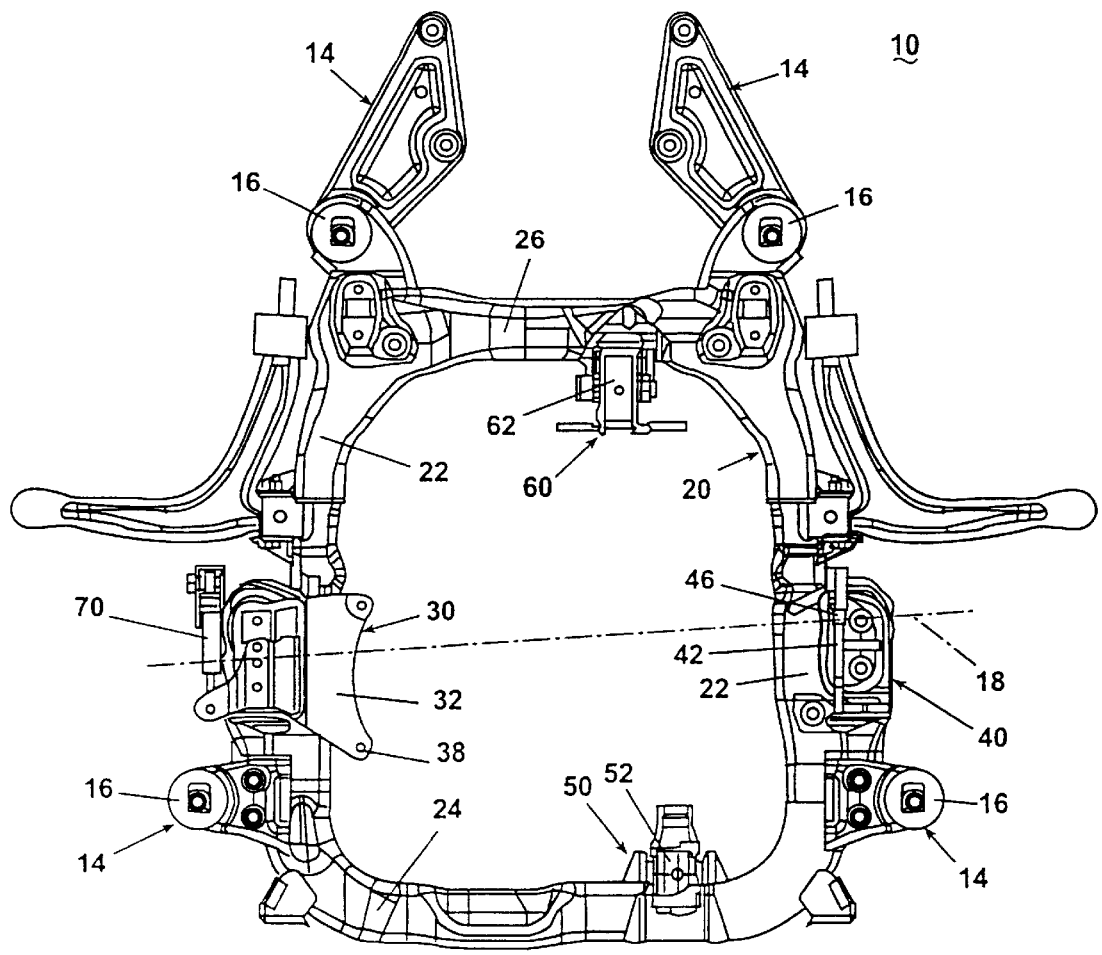
FIG. 2 is a plan view of the double-isolated, symmetric, high-damped mount system of FIG. 1.

The mount system 10 according to the invention is primarily directed to a transversely mounted powertrain, such as is commonly used in a front-wheel drive vehicle. In the embodiment depicted in FIGS. 1–2, a transversely mounted powertrain (not shown) is mounted at a first end to an engine mount 30 and at a second end to a transmission mount 40 as the primary load carrying mounts. The cradle 20 is generally a rigid frame including opposing side rails 22, a front rail 24 and a back rail 26. The engine mount 30 is operably connected to one of the side rails 22, and the transmission mount 40 is operably connected to the opposing side rail 22 in alignment with the engine mount 30. Each of the engine mount 30 and the transmission mount 40 includes, respectively, an engine mounting bracket 32 and transmission mounting bracket 42 operably connected to a respective side rail 22 by a plurality of supports 34, 44 and comprising an elastomeric bushing and hydraulic damping system with damping oriented substantially vertically to react gravitationally induced forces. Each of the engine mounting bracket 32 and the transmission mounting bracket 42 is connected to the powertrain at first connection points 36, 46 arranged to lie on the neutral torque axis 18 of the powertrain as shown in the plan view of FIG. 2. The engine mounting bracket 32 and the transmission mounting bracket 42 are respectively connected to the power train at additional connection points 38, 48 displaced from neutral torque axis 18.

The mount system 10 further comprises a front torque reaction mount 50 and a rear torque reaction mount 60. Each of the torque reaction mounts 50, 60 is rigidly connected to the powertrain and to cradle 20, and incorporates an element for both resisting the torque exerted about the neutral torque axis and isolating torque-related vibrations from the cradle. In the illustrated embodiment, the element for isolation of torque-related vibrations is a voided bushing 52, 62, a generally cylindrical elastomeric body having sections removed for the purpose of altering the cross section of the cylindrical elastomeric body such that as the torque reaction mount operates about the neutral torque axis 18. The voided bushing 52, 62 is oriented such that the elastomer is presented to torque-related forces and vibrations in shear, rather than compression, to provide an effective spring constant that more effectively isolates the vibrations from the cradle 20.

The mount system 10 further comprises a damper 70 rigidly connected to each of the powertrain and the vehicle frame at a position displaced from the neutral torque axis 18 of the powertrain and oriented to react translational vibration. Damper 70 is preferably a friction damper, which has the advantage over a hydraulic damper of being more compact in size, lower in cost, and more durable.

A force generated by the powertrain about the neutral torque axis, and particularly torque-related vibrations, is countered by the reactive forces of the front and rear torque reaction mounts 50, 60, the engine mounting bracket 30 and the transmission mount 40. The friction damper 70 is tuned to eliminate the development of harmonics and therefore resists the development of increasing oscillations due to the vibrations generated by the powertrain and potentially transmitted and amplified by the cradle and vehicle frame.

The specific structure disclosed for each type of mounting has been found to be sufficiently robust for this application and displays the reactive properties desirable in developing the isolation system, but, as is well known by the state of the art, other combinations of connectors having a compatible set of reaction characteristics can function in much the same manner.

While the invention has been specifically described in connection with certain specific embodiments thereof, it is to be understood that this is by way of illustration and not of limitation, and the scope of the appended claims should be construed as broadly as the prior art will permit.

What is claimed is:

1. A power train mount system comprising a cradle, a plurality of frame mounts for mounting the cradle to a vehicle frame, and a plurality of power train mounts for mounting the power train to the cradle,
   wherein a first pair of mounts are provided to carry loads and include connecting points that lie on a neutral torque axis, the first pair of mounts providing vertically oriented damping and wherein a friction damper is provided in an orientation to react translational vibration between the vehicle frame and the powertrain so that translational displacements are controlled.

2. The power train mount system according to claim 1, further comprising a second pair of power train mounts providing torque reaction and biased to resist torque exerted about the neutral torque axis.

3. The power train mount system according to claim 1, wherein the friction damper is oriented along a line that passes through the neutral torque axis and is parallel to a longitudinal axis of the vehicle.

4. The power train mount system according to claim 1, wherein the frame mounts comprise resilient bushings.

5. The power train mount system according to claim 1, wherein the first pair of power train mounts include a mechanical connection lying on the neutral torque axis in a plan view.

6. The power train mount system according to claim 5, wherein the first pair of power train mounts each include at least one hydraulic damper.

7. The power train mount system according to claim 6, wherein the first pair of power train mounts includes a pair of hydraulic dampers aligned such that the primary damping effect responds to gravitational loads applied to the power train.

8. The power train mount system according to claim 2, wherein the second pair of power train mounts are formed from a voided resilient bushing oriented such that torque-related forces act on the resilient bushing in shear.

9. A power train mount system comprising a power train mounting sub-frame, a plurality of frame mounts for mounting the sub-frame to a vehicle frame, and a plurality of power train mounts for mounting the power train to the sub-frame,
   wherein at least one of the power train mounts includes a vibration-absorptive element biased in a direction to resist torque exerted about the neutral torque axis.

10. The power train mount system of claim 9, wherein the vibration-absorptive element comprises a voided elastomeric bushing oriented such that torque-related forces act on the elastomeric bushing in shear.

11. A power train mount system for mounting a vehicle power train to a vehicle frame, the mount system comprising a power train mounting cradle, a plurality of frame mounts for connecting the cradle to a vehicle frame and a plurality of power train mounts for connecting a power train to the cradle, and a friction damper for connecting to a power train and a vehicle frame,
   wherein the frame mounts comprise an elastomeric bushing;
   wherein the power train mounts comprise a first pair of mounts for supporting the power train and damping vibrations between the power train and the cradle, the first pair of mounts each including a connection point to the power train on a neutral torque axis of the power train in a plan view, the first pair of mounts providing damping oriented in a vertical direction to react gravitationally induced forces, the power train mounts further comprising a second pair of mounts for damping torque-related vibrations, the second pair of mounts including a voided bushing having an elastomeric element oriented transversely to resist torque exerted about the neutral torque axis such that torque-related vibrations are received in shear in the elastomeric element of the voided bushing, and
   wherein the friction damper is along a line that passes through the neutral torque axis and is parallel to a longitudinal axis of the vehicle for providing damping of translational vibrations so that translational displacements are controlled.

* * * * *